United States Patent Office 2,721,800
Patented Oct. 25, 1955

2,721,800

PHOTOGRAPHIC ELEMENTS CONTAINING ANTIFOGGING AGENTS

John Morgan and Donald A. J. Starkey, Harrow, England, assignors to Eastman Kodak Company, Rochester, N. Y., a corporation of New Jersey No Drawing. Application August 12, 1953,
Serial No. 373,902

9 Claims. (Cl. 95—7)

This invention relates to fog-inhibiting agents for stabilizers for photographic emulsions and to photographic emulsions containing them.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is of course desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is, accordingly, an object of our invention to provide a method for stabilizing photographic emulsions. A further object of our invention is to maintain the sensitivity and fog of silver halide emulsions at or close to initial optimum values under keeping conditions of high temperature and humidity. A further object is to provide photographic silver halide emulsions containing antifoggants or stabilizers. Other objects will become apparent from a consideration of the following description and examples.

The above objects are, in general, accomplished by adding to the photographic emulsion certain organic compounds of the following general formula:

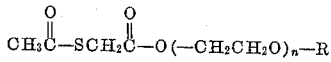

wherein R represents a hydrogen atom or an acetylthioglycollyl group, and $n$ represents a positive integer, e. g. 1 to 200, or more. The compounds represented by the above general formula wherein R represents a hydrogen atom can advantageously be prepared by reacting acetylthioglycollic acid together with ethylene oxide in varying amounts. By varying the quantity of ethylene oxide it is possible to produce monoesters wherein $n$ has any desirable value. This method of making monoesters is well known and has been previously described in the prior art. Advantageously, the reaction is carried out in the presence of an acidic catalyst, such as boron trifluoride in the presence of acetic acid.

The compounds represented by the above general formula wherein R represents an acetylthioglycollyl group can advantageously be prepared by condensing together acetylthioglycollic acid chloride (or another acid halide such as bromide, etc.) with a suitable glycol such as ethylene glycol, diethylene glycol, triethylene glycol, the polyethylene glycols, etc. The condensations can advantageously be carried out in the presence of an acid-bonding agent such as pyridine, quinoline, etc. Also, the use of an inert solvent, such as dioxane, diethyl ether, etc. may serve to increase the yields of the desired diester.

The following examples will serve to illustrate a method of preparing certain esters useful in our invention.

*Example 1.—Triethyleneglycol bis(acetylthioglycollic ester)*

Triethyleneglycol (7.5 gms. 0.05 mol.), pyridine (8 gms.) and dioxane (30 ml.) were stirred together at room temperature and acetylthioglycollyl chloride (16 gms. 0.1 mol.+10%) was slowly added. Pyridine hydrochloride was immediately precipitated and after complete addition (20 mins.) stirring was continued for 15 minutes. The mixture was allowed to stand for 1 hour and was then poured into water (250 ml.). The ester separated as an oil which was extracted with ether (3 x 50 ml. portions). The ether solution was dried for 6 hours over anhydrous sodium sulphate and the ether removed on a steam bath.

The yellowish oil was distilled and the fraction boiling at 220°–224°/0.5 mm. Hg was collected.

Yield=15 gms. (82% theoretical).

Analyses:
  Calc. for $C_{14}H_{22}O_8S_2$—
    C=44.0%
    H=5.71%
    S=16.94%
  Found—
    C=44.0%
    H=5.72%
    S=17.0%

*Example 2.—Polyethylene glycol mono-acetylthioglycollic ester.*

Acetylthioglycollic acid (14 gms. 0.1 mol.) was dissolved in benzene (100 ml.) and boron trifluoride in acetic acid (1 ml.) was added. Pure ethylene oxide was passed into the solution at such a rate that the temperature did not exceed 40° C. The flow was stopped after an increase in weight of 30 gms. (approx. 7 mols/mol. acid) was observed (15 hours). The excess ethylene oxide, benzene and any dioxane formed during the reaction were evaporated off on a steam batch, finally in vacuo for 1 hour.

Yield of colourless oil=44 gms.

In a manner similar to that illustrated above in Examples 1 and 2, other mono- and diesters coming within the scope of the above general formula can be prepared. By using larger or smaller mole quantities of ethylene oxide than illustrated in Example 2 it is possible to obtain monoesters wherein the value of $n$ in the above general formula has various values. Likewise, by varying the glycol used in the method described in Example 1 it is possible to obtain esters represented by the above general formula wherein $n$ has various values.

As shown in the above Example 2, when a large amount of ethylene oxide is employed with respect to the quantity of acetylthioglycollic acid, the reaction mixture contains a mixture of esters wherein the value of $n$ varies. Likewise, when a polyglycol is employed in the process of Example 1, a mixture of esters, wherein the value of $n$ varies, results. While it is sometimes possible to separate these mixtures into the component esters, it is not necessary to do so. Accordingly, in the following table, in some cases only the average value of $n$ is given. Mixtures of esters, or pure esters, can be employed to advantage in practicing our invention. Mixtures of monoesters with diesters are also effective.

The fog inhibitors which we propose to use are added to the emulsion during the process of manufacture, to avoid loss of sensitivity and to inhibit the growth of fog with passage of time under non-ideal conditions of storage.

A solution of the compounds of the invention when added in suitable concentration, before coating, to unsensitized, chemically sensitized, or optically sensitized photographic emulsions does not appreciably affect the sensitometric values for sensitivity and fog when measurements are made soon after coating. When sensitometric measurements are made at appreciable intervals of time, at elevated temperatures and dry or somewhat humid conditions, these compounds do stabilize photographic speed and maintain fog at a low level.

The preparation of silver halide emulsions involves three separate operations: (1) the emulsification and digestion or ripening of the silver halide, (2) the freeing of the emulsion from excess soluble salts, usually by washing, and (3) the second digestion or after-ripening to obtain increased sensitivity. (Mees "The Theory of the Photographic Process," 1942.) We prefer to add the fog-inhibiting agents after the final digestion or after-ripening, although they can advantageously be added prior to digestion.

The photographic emulsions used in practicing our invention are generally of the developing-out type; also, it is to be understood that photographic emulsions of varying halide content can advantageously be used. The antifoggant compounds used in our invention have been found particularly useful when employed in conjunction with gelatino-silver bromiodide emulsions, although they can also be advantageously employed for stabilizing other silver halide emulsions, such as gelatino-silver chloride, bromide, chlorobromide, chlorobromiodide, etc. The emulsions can be unsensitized, or sensitized with chemical sensitizers or optical sensitizers. Sulfur sensitizers such as those disclosed in Sheppard U. S. Patent 1,574,944 can advantageously be added to the emulsions in the conventional manner. Also, various gold sensitizers can be employed in the photographic emulsions stabilized according to our invention.

The antifoggant or stabilizing activity of a number of compounds coming within the scope of the above general formula was determined by incubation of the emulsion for a period of three days as indicated in the table below. The efficiency of the various antifoggants was then evalued by measuring the speed and fog of the incubated emulsions containing an antifoggant and comparing these measurements with those of the same batch of emulsion before incubation. Also, similar measurements were made on a photographic emulsion containing no antifoggant, both before and after incubation. The relative humidity was adjusted to 94% for the purposes of incubation. The tests were made using a high speed silver bromiodide emulsion exposed on an Eastman Type Ib sensitometer with an exposure of $\frac{1}{50}$ second and then developed for five minutes in a developer of the following composition:

| | G. |
|---|---|
| N-methyl-p-aminophenol sulfate | 2.2 |
| Hydroquinone | 8.8 |
| Sodium sulfite (anhydrous) | 72.0 |
| Sodium carbonate (cryst.) | 130.0 |
| Potassium bromide | 4.0 |

Water to make 1 liter.

POLYETHYLENEGLYCOL-BIS-ACETYLTHIOGLYCOLLIC ESTERS

| Example | No. of Ethylene glycol units | Concentration, g./mol. AgX | Initial tests | | 3 days' incubation, fog |
|---|---|---|---|---|---|
| | | | Speed | Fog | |
| Blank | | | 100 | .12 | 1.40 |
| A | 2 | 0.4 | 75 | .11 | .07 |
| B | 3 | 0.4 | 95 | .12 | .07 |
| C | average 7 | 0.4 | 95 | .13 | .07 |
| D | average 9 | 0.4 | 105 | .13 | .10 |
| Blank | | | 100 | .22 | 2.54 |
| E | average 80 | 0.08 | 105 | .29 | 1.46 |

POLYETHYLENEGLYCOL-MONO-ACETYLTHIOGLYCOLLIC ESTERS

| Blank | | | 100 | .26 | 2.15 |
|---|---|---|---|---|---|
| F | average 1½ | 0.13 | 105 | .27 | .26 |
| G | average 7 | 0.25 | 105 | .31 | .31 |
| Blank | | | 100 | .08 | .84 |
| H | average 55 | 0.85 | 135 | .10 | .57 |

Incubation temperature, 120° F.

In a manner similar to that illustrated in the above examples, other mono and diesters selected from those represented by the above general formula can be incorporated in photographic emulsions for the purpose of stabilization. The fog-inhibiting agents useful in practicing our invention can be used in various kinds of photographic emulsions. In addition to being useful in ordinary non-sensitized emulsions, they can also be used in orthochromatic, panchromatic and X-ray emulsions. If used with sensitizing dyes, they can be added to the emulsion before or after the dyes are added. Suitable dispersing agents for the silver halide emulsions stabilized according to our invention comprise gelatin, or other colloids, such as collodion, albumen, cellulose organic derivatives, synthetic resins, etc.

The optimum amount of fog-inhibiting agent can be determined by making the customary tests employed in emulsion making. Of course, the optimum amount for a given emulsion will vary depending on the presence of emulsion addenda, such as chemical sensitizers, optical sensitizers, etc. In general, we have found that from 0.01 to 1.0 g. of fog-inhibiting agent per mole of silver halide is sufficient for the purpose of our invention.

Instead of adding the fog-inhibiting agent directly to the photographic emulsion, it is sometimes desirable to incorporate the fog-inhibiting agent in a separate layer which is placed in contact with the silver halide emulsion layer which is to be stabilized. Under such conditions, of course, it is advisable to use a higher concentration of fog-inhibiting agent than indicated above. In general, we have obtained excellent results by simply adding a solution of the antifoggant in a suitable solvent, such as ethanol, propanol, etc. directly to the emulsion which is to be stabilized. This method is the one used in Examples A–H above.

What we claim as our invention and desire secured by Letters Patent of the United States is:

1. A photographic silver halide emulsion containing at least one compound selected from those represented by the following general formula:

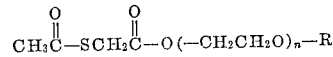

wherein R represents a member selected from the group consisting of a hydrogen atom and an acetylthioglycollyl group and $n$ represents a positive integer.

2. A photographic silver halide emulsion containing a compound selected from those represented by the following general formula:

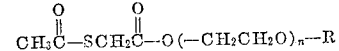

wherein R represents a member selected from the group consisting of a hydrogen atom and an acetylthioglycollyl group and $n$ represents a positive integer of from 1 to 200.

3. A photographic gelatino-silver bromiodide emulsion containing at least one compound selected from those represented by the following general formula:

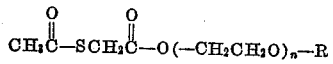

wherein R represents a member selected from the group consisting of a hydrogen atom and an acetylthioglycollyl group and $n$ represents a positive integer of from 1 to 200.

4. A photographic silver halide emulsion containing a compound having the following formula:

wherein $n$ is 2.

5. A photographic silver halide emulsion containing a compound having the following formula:

wherein $n$ is 3.

6. A photographic silver halide emulsion containing a compound having the following formula:

wherein $n$ has an average value of 9.

7. A photographic silver halide emulsion containing a compound having the following formula:

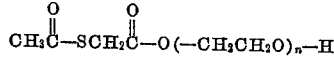

wherein $n$ has an average value of 1½.

8. A photographic silver halide emulsion containing a compound having the following formula:

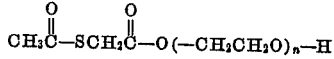

wherein $n$ has an average value of 7.

9. A light-sensitive photographic element comprising a silver halide emulsion layer and an organic colloid layer contiguous to said emulsion layer at least one of said layers containing as a stabilizing agent for said emulsion layer a compound selected from those represented by the following general formula:

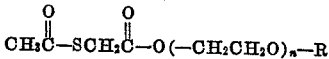

wherein R represents a member selected from the group consisting of a hydrogen atom and an acetylthioglycollyl group and $n$ represents a positive integer.

References Cited in the file of this patent
UNITED STATES PATENTS
2,657,135   Lowe et al. -------------- Oct. 27, 1953